July 17, 1962 F. A. WILHELM 3,044,294
MASS FLOW SENSING MEANS
Filed Sept. 17, 1958
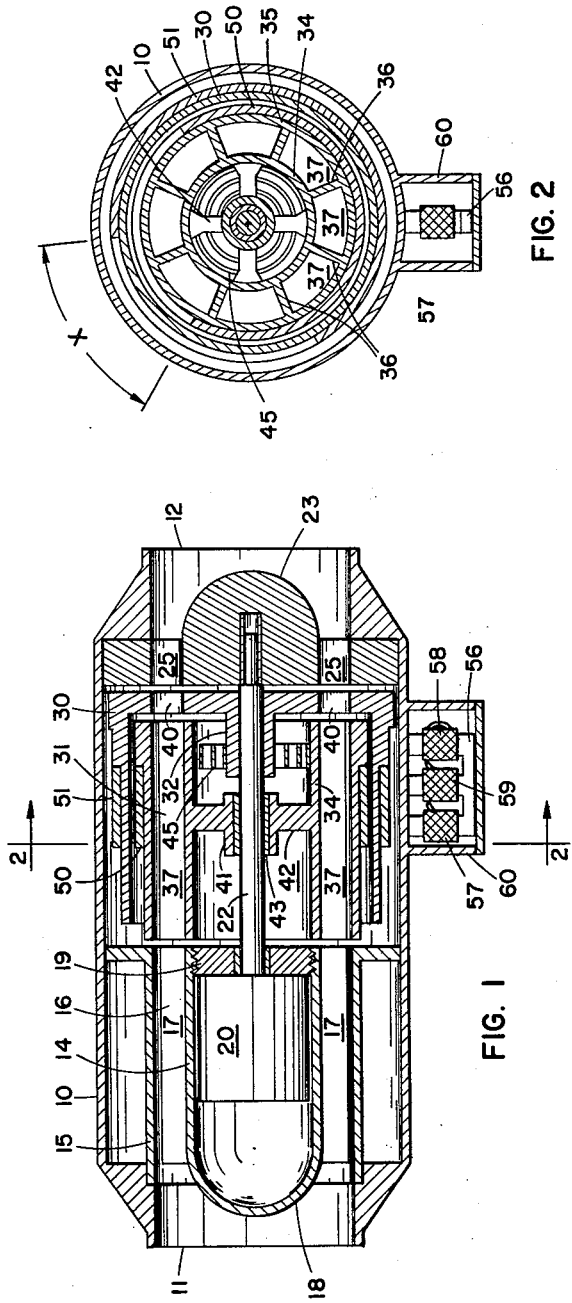
INVENTOR.
FRANCIS A. WILHELM
BY
Grover G. Frater
ATTORNEY

United States Patent Office 3,044,294
Patented July 17, 1962

3,044,294
MASS FLOW SENSING MEANS
Francis A. Wilhelm, Birmingham, Mich., assignor to The Bendix Corporation, a corporation of Delaware
Filed Sept. 17, 1958, Ser. No. 761,513
3 Claims. (Cl. 73—194)

This invention relates to improvements in sensing means and particularly to sensing means for representing the condition of a variable as a time interval.

One object of the invention is to provide improved means for this purpose. Other objects are to provide improved and novel sensing means for measuring a variable condition within a sealed case without the need for a case opening for transmission of information to a point outside the case, and to provide an improved means for sensing mass rate of fluid flow in a flowmeter.

While other physical phenomenon may be employed in practicing the invention, magnetics are advantageously employed and another object is to provide a novel sensing means using magnetic elements for representing the condition of a variable as a time interval.

Certain of these objects are realized in practicing the invention by provision of a sensing element and a pair of elements rotatable at the same speed past the sensing element, the rotating elements jointly contributing to form a discontinuity which the sensing element can measure and which discontinuity extends over an arcuate angle which is variable in accordance with the condition, whereby the magnitude of the angle, and the variable, is represented by the time duration of the discontinuity measured at the sensing element and is remeasured with each revolution of the rotating elements. Means are also provided for changing the relative angular displacement of said elements to alter the magnitude of said arcuate angle in accordance with changes in the condition of the variable. A pickup sensitive to continuity or discontinuity in both elements provides a signal, or an interruption in another signal, over the period of time during which both elements have a discontinuous portion passing said position.

Advantageously these elements are employed in a fluid flowmeter and it is now preferred that the pickup employ magnetics. Such an embodiment of the invention has been selected for illustration.

Other objects and advantages of the invention will be apparent in the following specification and in the drawing which shows one embodiment of the invention, it being understood that modifications may be made in the embodiment illustrated and that other embodiments are possible without departing from the invention or the appended claims.

In the drawings:

FIG. 1 is a view in central section of a fluid flowmeter embodying the invention.

FIG. 2 is a sectional view taken on line 2—2 of FIG. 1;

FIG. 3 is a schematic diagram of the pickup of FIG. 1;

FIG. 4 is a graph of the voltage output from the pickup plotted against time; and FIG. 5 is a schematic representation of the relative position of the magnetic elements of FIG. 1 for one condition of the variable whose condition is sensed.

The flowmeter in FIGS. 1 and 2, is encased in a generally cylindrical housing 10 having inlet and outlet ends 11 and 12, respectively, of reduced diameter. Within the housing toward the inlet end is a flow straightening structure designed to confine the flow of incoming fluid so that the fluid particles have zero average rotational component of velocity as they pass toward the other elements within the meter. This structure comprises concentric cylinders 14 and 15 connected by radially extending straightening vanes 16 which are spaced around the outer periphery of cylinder 14 and the inner periphery of cylinder 15 to form longitudinal flow passages 17. The inner cylinder 14 is sealed by an integrally formed dome 18 at its upstream end and by a motor mounting plate 19 threaded into its downstream end.

A drive motor 20 is disposed within the cylinder 14 where it is held by attachment to motor mount 19, its shaft 22 extending through a sealing bushing centrally of the motor mount. The opposite end of the shaft is of reduced diameter and extends into a bearing carried centrally by a bearing mount 23 extending across the inner diameter of the housing 10 adjacent its outlet end 12. Openings 25 in bearing mount 23, whose dimensions and spacing are advantageously like the flow spaces 17 as shown, permit egress of the fluid.

A driver 30 and an impeller 31 are housed within casing 10 in the space between the flow straightening structure and bearing mount 23. The driver 30 is cup-shaped and has a boss 32, extending inwardly in the cup from the central portion of its bottom, forming a hub for the motor shaft 22 to which it is fixed by any convenient means, as by being press-fitted onto shaft 22 as shown.

The impeller 31 is disposed within the cup-shaped driver 30. It comprises inner and outer cylinders 34 and 35 connected by radially extending blades 36 spaced around the outer periphery of cylinder 34 and the inner periphery of the outer cylinder 35, as best illustrated in FIG. 2, to form flow passages 37. Advantageously, passages 37 of the impeller, passages 17 of the flow straightening structure, openings 25 of bearing mount 23, and openings 40, formed in the bottom wall of the driver 30 are alike in size and spacing and are concentric with and at the same radial distance from the axis of motor shaft 22, as shown.

Impeller 31 includes a hub 41 connected by spokes 42 to inner cylinder 34 and rotatably mounted on motor shaft 22 by a bushing 43. The impeller is connected to driver 30 by a spring such, for example, as spring 45 which is flat and coiled, extending from a connection to inner cylinder 34 of the impeller at one end to a connection to hub 32 of driver 30 at its other end.

Upon energization of motor 20, its shaft 22 and driver 30 are rotated at motor speed. Because of its connection to driver 30 through spring 45, impeller 31 is also rotated at the same speed. But if some force is applied to retard rotation of impeller 31 it will lag the driver in rotation, winding or unwinding spring 45 until the force stored in the spring is equal to the impeller retarding force. Thus the impeller will be angularly or rotationally displaced relative to the driver 30 through an angle which depends upon the magnitude of the retarding force and the spring rate of spring 45. Advantageously, the spring is linear, as shown, whereby the displacement angle varies with retarding force.

Fluid, flowing through the meter through inlet 12, passages 17 and 37 and openings 40 and 25 to outlet 12, presents such a retarding force to the impeller 31. The fluid, which has zero rotational velocity as it passes through passages 17, is accelerated rotationally upon passing into impeller passages 37.

By Newton's law the impeller experiences a retarding force equal to the mass of the fluid which is accelerated in unit time times its acceleration. Since the fluid has zero initial rotation and is accelerated to the rotational velocity of the impeller, the retarding force equals fluid mass times impeller speed divided by unit time.

Novel means are provided for sensing the magnitude of this angle. Elements rotatable in accordance with rotation of the driver and impeller, respectively, are provided. These are made discontinuous over an arcuate distance less than a complete loop by an angle which is not less than the greatest angle of relative displacement of the driver and impeller which it is desired to sense. The elements are displaced angularly relative to one another such that during rotation both elements have a discontinuous portion opposite a fixed position adjacent their path of rotation for a rotational distance proportional to a given degree of relative driver-impeller displacement. Means are employed to provide signals lasting over the periods during which neither element has a continuous portion passing that position.

In the embodiment selected for illustration, a first armature 50 of magnetic material is secured by any convenient means to the outer surface of the impeller 31 and a second armature 51 of magnetic material is secured by any convenient means to the outer surface of driver 30, so that armature 51 is concentric with, and advantageously overlies the armature 50, as shown. Neither armature is continuous but each has a discontinuity, in the form of a gap, so that it forms a segment of a circular ring or cylinder.

When it is desired to provide a signal whose duration is a direct measure of the fluid flow rate or the relative angular displacement between the impeller and driver, the armatures 50 and 51 are oriented so that when flow rate or relative driver-impeller displacement angle is zero, one armature is disposed opposite the gap in the other, the gap of one ending on the radial line where the other begins as illustrated in FIG. 5.

When motor 20 is energized and when fluid flow rate is zero, the impeller 31 will not be displaced with respect to driver 30. Consequently as the impeller and driver rotate to rotate armatures 50 and 51, one or the other of the armatures has a continuous portion passing any position adjacent their paths of rotation throughout the entire revolution of the armatures. But if fluid is made to flow through the flowmeter at a given rate, the impeller 31 will be displaced relative to the driver 30 by some angle $x$ displacing armature 50 counterclockwise relative to armature 51 by angle $x$ and opening a gap in the joint magnetic influence of armatures 50 and 51 equal to the angle $x$.

Thus as the armatures rotate past a fixed position adjacent their path of travel they will jointly exert a continuous magnetic influence at that position during each revolution except for that period during which the gap in magnetic influence is passing that position.

Means are employed to provide a signal during the period when both elements have a discontinuous portion passing that position. In this case, the means comprises a magnetic pickup such as the pickup illustrated. This device comprises an E-shaped core 56 having magnetizing windings 57 and 58 around its outer legs and a pickup winding 59 coiled about its center leg. The core is mounted in a well 60 formed on the outer surface of casing 10 adjacent the rotational path of magnetic armatures 50 and 51.

Windings 57 and 58 are wound in like direction whereby the magnetism they induce in core 56 tends to cancel in the center leg. If windings 57 and 58 were made to have like magnetic effect so that the magnetism in the center leg would be entirely cancelled when the gap of both armatures was opposite core 56 and no voltage would appear across winding 59 until one of armatures 50 or 51 is rotated opposite the core. Since the armatures are off-set, as shown, to overlie only the legs encircled by windings 57 and 59 more magnetism would be induced in the legs encircled by windings 57 and 59 than in the legs encircled by windings 58 and 59 and a voltage would be induced in winding 59 when one of the armatures was disposed opposite the core.

In certain applications it is desirable that a voltage be induced in winding 59 only when the gap of both armatures is opposite core 56. This can be accomplished by making winding 57 of fewer turns than winding 58, as shown, or otherwise reducing the magnetic effect of winding 57 so that the magnetism in the center leg is cancelled only when one or both of armatures 50 or 51 is opposite core 56. Then the center leg magnetism will be unbalanced and a voltage will be induced across winding 59 when the gap of both armatures is opposite core 56. The apparatus illustrated is so arranged.

A separate signal is provided for each revolution of the driver and impeller. Additional gaps in armatures 50 and 51 may be provided if the flow rate is required to be sensed oftener than once each revolution but a single sensing per revolution has been found to be adequate for many applications of the invention.

The armatures 50 and 51 may be magnetized but need not be, and advantageously are not, magnetized, as shown. Of course, the case 10, driver 40, and impeller 31 are formed of non-magnetic materials at least in those portions proximate to the pickup.

It is to be noted that the angle $x$ varies not only with mass rate of fluid flow but also with the speed of rotation of the impeller since the retarding force is a joint function of mass flow rate and impeller speed. However, the time required for rotation of the armatures through the angle $x$ is equal to impeller (and driver) speed divided by that angle. Comparison of these two relationships shows that the time for rotation of the armatures through angle $x$, and so the time duration of winding 59 output, is independent of impeller speed and varies only as mass rate of fluid flow.

Accordingly, it will be apparent that motor 20 need not rotate at constant speed. Its speed may vary as a result of varying load torque or as a result of varying electrical supply frequency without variation of the time duration of the winding 59 output signal voltage.

I claim:

1. Mass rate of fluid flow sensing means for representing the mass rate of fluid flow as a time interval, comprising means to confine the flow to be measured to velocity in one direction, rotary impeller means in the path of said flow for imparting rotational acceleration to said fluid in another direction, means for rotating said impeller means comprising a rotational driver and a spring connected to the driver at one end and to the impeller means at the other end, said impeller means being mounted for angular displacement relative to said driver upon distortion of said spring, first and second magnetic elements carried by said impeller means and driver respectively in concentric relation for rotation about a common axis, a magnetic pickup fixed proximately to the rotational path of said magnetic elements and sensitive to magnetic influence resulting from proximity to either of them, said elements being formed as arcuate segments relatively angularly displaced to provide jointly a magnetic influence discontinuous throughout an angle variable in accordance with variations in the relative angular displacement of said impeller means and said driver.

2. Fluid flow rate sensing means comprising a driver including a cylindrical member encompassing said flow path and rotatable about an axis extending in the direction of said flow path; a fluid impeller in said flow path disposed concentrically within said member and rotatable about said axis; said impeller including means for imparting rotational acceleration to fluid flowing along said flow path; a resilient driving element interconnecting said driver and said impeller effective to permit relative rotational displacement of said driver and impeller in proportion to the force exerted by said impeller on fluid flowing along said flow path; and means for sensing the degree of such displacement comprising arcuately formed and concentrically disposed strips of magnetic material rotatably carried one by said driver and another by said impeller and a pickup element disposed at a point adjacent the rotational path of said strips and sensitive to provide an electrical signal effective to indicate the absence of either strip at said point, said strips having a combined length and relative placement to complete less than a circle by an arcuate amount proportional to any such relative displacement between said impeller and said driver.

3. The invention defined in claim 2 in which said pickup element comprises an E-shaped magnetic core disposed such that the center and one outer leg only overlie the rotational path of said strips; said core having an output winding about said center leg and having energizing windings about its outer legs effective when energized, to produce flux in said center leg tending to cancel in a degree which is different when a portion of one of said strips underlies said core than it is when no portion of said strips underlies said core.

References Cited in the file of this patent

UNITED STATES PATENTS

| | | |
|---|---|---|
| 2,602,330 | Kollsman | July 8, 1952 |
| 2,754,683 | Waugh | July 17, 1956 |
| 2,943,487 | Potter | July 5, 1960 |

FOREIGN PATENTS

| | | |
|---|---|---|
| 535,484 | Germany | Oct. 10, 1931 |
| 600,980 | Great Britain | Apr. 23, 1948 |
| 740,037 | Great Britain | Nov. 9, 1955 |
| 1,135,367 | France | Apr. 26, 1957 |